United States Patent
Swift et al.

(10) Patent No.: US 8,394,520 B2
(45) Date of Patent: *Mar. 12, 2013

(54) THERMAL BATTERY ELECTROLYTE MATERIALS, ELECTRODE-ELECTROLYTE COMPOSITES, AND BATTERIES INCLUDING SAME

(75) Inventors: Geoffrey Swift, Joplin, MO (US); Charles Lamb, Carthage, MO (US)

(73) Assignee: Eaglepicher Technologies, LLC, Joplin, MO (US)

( * ) Notice: Subject to any disclaimer, the term of this patent is extended or adjusted under 35 U.S.C. 154(b) by 324 days.

This patent is subject to a terminal disclaimer.

(21) Appl. No.: 12/754,405

(22) Filed: Apr. 5, 2010

(65) Prior Publication Data

US 2010/0310917 A1    Dec. 9, 2010

Related U.S. Application Data

(60) Provisional application No. 61/167,040, filed on Apr. 6, 2009.

(51) Int. Cl.
*H01M 6/36* (2006.01)
*H01M 6/20* (2006.01)

(52) U.S. Cl. ........ 429/112; 429/199; 429/206; 252/62.2

(58) Field of Classification Search .................. 429/112, 429/199, 206; 252/62.2
See application file for complete search history.

(56) References Cited

U.S. PATENT DOCUMENTS

| | | | |
|---|---|---|---|
| 3,898,096 A | 8/1975 | Heredy et al. | |
| 3,992,222 A | 11/1976 | Walsh et al. | |
| 4,259,415 A | 3/1981 | Tamura et al. | |
| 4,608,324 A | 8/1986 | Fujii et al. | |
| 4,728,590 A | 3/1988 | Redey | |
| 4,954,403 A | 9/1990 | Plichta et al. | |
| 5,180,642 A | 1/1993 | Weiss et al. | |
| H1335 H | 7/1994 | Plichta et al. | |
| 5,534,367 A | 7/1996 | Kaun | |
| 5,667,916 A | 9/1997 | Ebel et al. | |
| 5,696,437 A | 12/1997 | Panther et al. | |
| 5,736,275 A | 4/1998 | Kaun | |
| 6,465,129 B1 | 10/2002 | Xu et al. | |
| 6,580,908 B1 | 6/2003 | Kroll et al. | |
| 6,936,379 B2 | 8/2005 | Gan et al. | |
| 7,476,467 B2 | 1/2009 | Park et al. | |
| 2003/0082452 A1 | 5/2003 | Ueda et al. | |
| 2003/0228520 A1 | 12/2003 | Kaun | |
| 2005/0003269 A1 | 1/2005 | Nanjundaswamy et al. | |
| 2005/0048370 A1 | 3/2005 | Guidotti et al. | |

(Continued)

FOREIGN PATENT DOCUMENTS

EP   1207568 A2   5/2002
EP   1 295 851 A1   3/2003

(Continued)

OTHER PUBLICATIONS

Hiroi et al., "Effective conductivities of FeS positives in LiCl-LiBr-LiF electrolyte at different states of charge", J. of Applied Electrochemistry 16 (1986), pp. 309-311.*

(Continued)

*Primary Examiner* — Gregg Cantelmo
(74) *Attorney, Agent, or Firm* — Oliff & Berridge, PLC

(57) ABSTRACT

Ternary or quaternary electrolyte material for use in thermal batteries that is substantially free of binders is disclosed. Composites of electrodes and electrolytes that contain the electrolyte material and batteries that contain the electrolyte material are also disclosed.

30 Claims, 4 Drawing Sheets

U.S. PATENT DOCUMENTS

| | | | |
|---|---|---|---|
| 2005/0102005 A1 | 5/2005 | Krig et al. | |
| 2005/0227146 A1 | 10/2005 | Ghantous et al. | |
| 2007/0077488 A1 | 4/2007 | Chen et al. | |
| 2007/0099080 A1 | 5/2007 | Pickett, Jr. et al. | |
| 2007/0292748 A1 | 12/2007 | Dekel et al. | |
| 2008/0090138 A1 | 4/2008 | Vu et al. | |
| 2008/0182170 A1 | 7/2008 | Rong et al. | |
| 2008/0299447 A1 | 12/2008 | Fujiwara | |
| 2010/0310917 A1 | 12/2010 | Swift et al. | |

FOREIGN PATENT DOCUMENTS

| | | |
|---|---|---|
| JP | A-61-135056 | 6/1986 |
| JP | 2061962 A | 3/1990 |
| JP | 2267861 A | 11/1990 |
| WO | 2005060026 A2 | 6/2005 |
| WO | 2009014845 A2 | 1/2009 |

OTHER PUBLICATIONS

Masset et al., "Retained molten salt electrolytes in thermal batteries", J. of Power Sources 139 (Available online Sep. 8, 2004), pp. 356-365.*

International Search Report and Written Opinion for International Application No. PCT/US2010/027612 mailed Jul. 27, 2010, 12 pages.

International Search Report and Written Opinion for International Application No. PCT/US2009/063716, dated Jan. 28, 2010, 15 pages.

International Search Report and Written Opinion for International Application No. PCT/US2010/029984 dated May 25, 2010, 13 pages.

International Search Report and Written Opinion for International Application No. PCT/US2010/029980, dated Jun. 1, 2010, 15 pages.

International Search Report and Written Opinion for International Application No. PCT/US2010/026408, dated May 10, 2010, 13 pages.

Sep. 20, 2011 International Preliminary Report on Patentability issued in Application No. PCT/US2010/027612, one page.

Oct. 24, 2011 European Search Report issued in European Patent Application No. 11171301.2-2119, five pages.

Sep. 14, 2012 Office Action issued in U.S. Appl. No. 12/614,667.

Sep. 24, 2012 Office Action issued in U.S. Appl. No. 12/725,872.

Nov. 13, 2012 Office Action issued in U.S. Appl. No. 12/754,417.

Oct. 16, 2012 Office Action issued in European Patent Application No. 09 752 072.0.

Sep. 20, 2011 International Preliminary Report on Patentability issued in Application No. PCT/US2010/027612.

Oct. 24, 2011 European Search Report issued in European Patent Application No. 11171301.2-2119.

U.S. Appl. No. 12/614,667, filed, Nov. 9, 2009 in the name of Chang et al.

U.S. Appl. No. 12/718,743, filed Mar. 5, 2010 in the name of Miller et al.

U.S. Appl. No. 13/161,614, filed Jun. 16, 2011 in the name of Swift et al.

U.S. Appl. No. 12/754,417, filed Apr. 5, 2010 in the name of Swift et al.

U.S. Appl. No. 12/725,872, filed Mar. 17, 2010 in the name of Zhang et al.

U.S. Appl. No. 61/112,562, filed Nov. 7, 2008 in the name of Chang et al.

Jan. 10, 2013 Office Action issued in U.S. Appl. No. 12/725,872.

* cited by examiner

THERMAL BATTERY ELECTROLYTE MATERIALS, ELECTRODE-ELECTROLYTE COMPOSITES, AND BATTERIES INCLUDING SAME

CROSS-REFERENCE TO RELATED APPLICATION

This application claims the benefit of U.S. Provisional Application No. 61/167,040, filed Apr. 6, 2009, which is incorporated by reference herein in its entirety.

BACKGROUND

The field of this disclosure generally relates to electrolyte material for use in thermal batteries and, particularly, to ternary or quaternary electrolyte material that is substantially binder-free. The disclosure also relates to composites of electrodes and electrolytes that contain the electrolyte material and cathode and/or anode material and to batteries that contain the electrolyte material.

Thermal batteries tend to have relatively long shelf lives, high energy densities, require relatively low maintenance, and can withstand relatively high temperatures. Thermal batteries also tend to provide a short burst of power over a relatively short period of time. The burst may range from less than a second to an hour or more, with power typically ranging from about a watt or less to kilowatts. Such properties make thermal batteries suitable for military (e.g., batteries for missile guidance systems) and space exploration applications. Thermal batteries may also be used in other applications, such as in electric vehicles.

A typical thermal battery includes an anode, a cathode, an electrolyte-separator containing a solid electrolyte that is non-conductive at ambient temperature, and a pyrotechnic material (e.g., heat pellet as in FIG. 1 which may contain, for example, Fe—$KClO_4$ powder) that provides a heat source to the battery. When battery operation is desired, an external stimulus is applied to the battery. For example, an electrical current may be applied to the battery to set off an electric match or an electro-active squib or a mechanical force (e.g., mechanical shock) may be applied to set off a concussion primer. The external stimulus causes the pyrotechnic material to ignite and begin to heat. Heat produced from the pyrotechnic material causes the previously solid electrolyte to melt and become conductive, which allows the battery to provide power for a desired application.

The anodes of thermal batteries are generally formed of an alkali or alkaline earth metal or alloy. A typical anode includes lithium metal or a lithium alloy, such as lithium aluminum, lithium silicon, or lithium boron.

Electrolytes for use with thermal batteries often include a eutectic mixture (i.e., a mixture which melts at a temperature lower than each of the individual components) of lithium chloride and potassium chloride and a binder, such as MgO, fumed silica or kaolin), which assists in containing the electrolyte within the thermal battery assembly upon melting, such as by capillary action, surface tension, or both. With typical thermal battery electrolytes, without sufficient binder, the electrolyte material may disperse throughout the battery, causing undesired shunts or short circuits in the cell. Unfortunately, the binder materials tend to be relatively resistant to ionic conduction and thus inclusion of the binder increases the impedance of the battery.

Cathode material for thermal batteries may vary in accordance with a variety of design parameters and generally includes a metal oxide or metal sulfide. By way of example, iron oxide ($FeO_4$), iron disulfide ($FeS_2$) or cobalt ($CoS_2$) disulfide are often used as cathode material.

Thermal batteries are often formed using pellet techniques, such that each of the electrolyte, cathode, and heat source are formed into a wafer. In this case, the respective cell component chemicals are processed into powders and the powders are pressed together to form the cell. Each component may be formed as a discrete part, or the anode and/or cathode may include (i.e., be flooded with) electrolyte material to improve the conductivity of the cell.

Although conventionally-used electrolyte material (including cathodes or anodes that contain such electrolyte material and including batteries that include the electrolyte material) work relatively well, the binder adds undesired impedance to the cell. Accordingly, there is a continuing need for thermal battery electrolyte material that allows the amount of binder present in the material to be reduced or even eliminated but yet prevents the electrolyte material from dispersing to portions of the cell that may result in shunts or short-circuits. A continuing need also exists for battery components and batteries that incorporate such electrolyte material.

SUMMARY

The present disclosure provides improved electrolyte material for use in thermal batteries including the cathodes and anodes thereof. The ways in which the improved electrolyte, cathode, anode, and battery overcome the shortcomings of the prior art are discussed in more detail below. In general, however, the disclosure provides a substantially binder-free thermal battery electrolyte, and a battery and components thereof, including the substantially binder-free electrolyte material.

One aspect of the present disclosure is directed to an electrolyte material for use in thermal batteries, the electrolyte material being substantially binder-free. The material includes at least about 25 wt % lithium bromide, at least about 4 wt % lithium chloride, and at least about 42 wt % lithium fluoride.

In another aspect of the present disclosure, a composite electrode-electrolyte for use in a thermal battery includes an electrode and substantially binder-free electrolyte material. The electrode may contain cathode material or anode material. The electrolyte material includes at least about 25 wt % lithium bromide, at least about 4 wt % lithium chloride, and at least about 42 wt % lithium fluoride.

In a further aspect, a battery includes an anode material, cathode material and electrolyte material. The electrolyte material is substantially binder-free and includes at least about 25 wt % lithium bromide, at least about 4 wt % lithium chloride, and at least about 42 wt % lithium fluoride.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

A more complete understanding of the present disclosure may be derived by referring to the detailed description and claims, considered in connection with the figures, wherein like reference numbers refer to similar elements throughout the figures, and:

Figure 1:
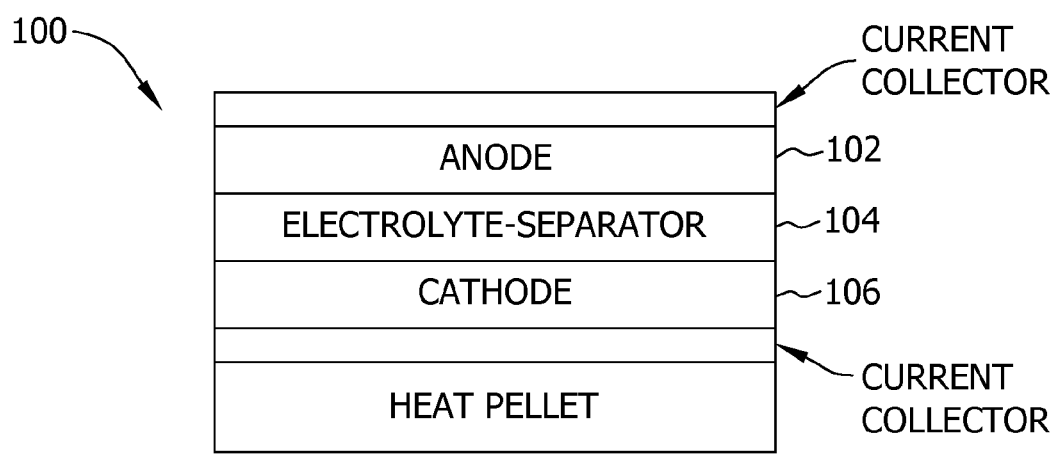
FIG. 1 illustrates an electrochemical device in accordance with various embodiments of the present disclosure.

Corresponding reference characters indicate corresponding parts throughout the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

The present disclosure generally relates to electrolyte salt formulations suitable for inclusion in components in thermal batteries and to batteries including the electrolyte material. FIG. 1 illustrates a thermal battery 100, in accordance with various embodiments of the disclosure, which includes an anode 102, an electrolyte-separator (electrolyte) 104, and a cathode 106. The electrolyte material of the present disclosure is suitable as a constituent in any or all of these battery components.

As used herein, an "electrochemical device" may otherwise be referred to herein as a battery (and in some embodiments, a "thermal battery"), a capacitor, a cell, an electrochemical cell, or the like. It should be understood that these references are not limiting, and any device that involves electron transfer between an electrode and an electrolyte is contemplated within the scope of the present disclosure. Further, an electrochemical device may refer to single or multiple connected electrochemical devices, electrochemical cells, batteries or capacitors capable of supplying energy to a load, and none of the references herein to any particular device should be considered to limit the disclosure in any way.

In accordance with various embodiments of the disclosure, thermal battery 100 components are prepared by consolidating powders via a mechanical pressing operation to produce pellets (i.e., wafers). Thermal batteries using pressed components are prepared by assembling in stacks the various components such as the anode 102, electrolyte-separator 104, and cathode 106, plus a heat source pellet if applicable to the particular battery design. Assembly of one each of anode 102, electrolyte-separator 104, and cathode 106 comprises a single electrochemical cell. Multiple cells may be stacked in series to produce a thermal battery. In this regard it should be understood that thermal battery designs other than as shown in FIG. 1 may be used without departing from the scope of the present disclosure.

Thermal battery anode materials in accordance with various embodiments of the disclosure include any suitable alkaline earth metal or alkali metal. By way of example, the anode includes lithium or lithium alloys, such as lithium aluminum, lithium silicon, and lithium boron alloys. For lithium alloys, the alloy is typically a powdered form. In order to improve performance of a thermal battery, for example, extend the life of the battery for a given amount of anode material, the anode may be "flooded" to form an anode-electrolyte composite wherein electrolyte salt is mixed with the lithium alloy powder and is part of the anode pellet that is pressed. The flooding allows ions to flow not just from the inner edge of the anode but from the bulk of the anode pellet.

Cathode materials can be prepared in the same or similar manner as anode materials, such that powders as mixed and pressed. In accordance with various embodiments of the disclosure, the cathode includes a metal compound, such as a metal oxide (e.g., $FeO_4$) or metal sulfide (e.g., $FeS_2$, $CoS_2$ or mixtures thereof) as the active material in the cathode. Suitable cathode materials may also include an amount of a bi-metal sulfide compound such as, for example, $CuFeS_2$ as disclosed in U.S. Pat Pub. No. 2010/0308253, filed Apr. 5, 2010, entitled "Thermal Battery Cathode Materials and Batteries Including Same," which claims the benefit of U.S. Provisional No. 61/167,042, filed Apr. 6, 2009, which are both incorporated herein for all relevant and consistent purposes.

Similar to anode powders, cathode sulfide powders may be mixed with an electrolyte salt to provide a flooded cathode to improve battery performance. As set forth in more detail below, inclusion of the electrolyte, in accordance with exemplary embodiments of the disclosure, into the cathode pellets of a thermal battery so as to form a cathode-electrolyte composite, improves the performance of a single cell containing a stack of anode pellet, electrolyte separator pellet and cathode pellet. The performance improvement is evident in the reduced cell impedance of the stack compared to a cathode using a conventional electrolyte.

In accordance with various embodiments of the disclosure, electrolyte material that does not include a binder (or is substantially binder-free) is used as the electrolyte-separator, is included in the anode material, and/or is included in the cathode material so as to form an electrode-electrolyte composite. In accordance with additional embodiments, the substantially binder-free electrolyte material may be incorporated into one or more battery components and alternative electrolyte material may be included in one or more of the other battery components.

In this regard it is to be noted that, as used herein, a "binderless" electrolyte material (or, alternatively, an electrolyte material "substantially binder-free") generally refers to an electrolyte that contains essentially no conventional binder, such as, for example, MgO, fumed silica or clay minerals such as kaolinite (including kaolin clays which are known to be rich in kaolinite). For example, in various embodiments, the electrolyte material may contain less than about 5 wt % binder, less than about 3 wt %, less than about 1 wt %, less than about 0.1 wt % or even no amount of binder (based on the total weight of the electrolyte material). Alternatively or in addition, the sum of the concentrations of the electrolyte material components (e.g., lithium bromide, lithium chloride, lithium fluoride, and optionally potassium bromide) may be at least about 95 wt %, at least about 96 wt %, at least about 97 wt %, at least about 98 wt %, at least about 99 wt % or even about 100 wt % (based on the total weight of the electrolyte material). Accordingly, in these or other embodiments, the electrolyte material may consist of the recited components (the electrolyte material being, for example, a ternary mixture of essentially three components, or a quaternary mixture of essentially four components) or consist essentially of these components (i.e., the material does not contain materials that are generally electrically conductive other than the recited components).

As previously noted, conventional electrolyte salts in thermal batteries include a binder material to serve as a static support after activation. While the salt is an inert solid at low temperatures, activation of the battery either through external heating or by inclusion of heat-generating material (for example, Fe—$KClO_4$ powder) raises the temperature such that the electrolyte melts and ionic conduction is possible between the anode and cathode. Conventional molten salts includes a binder material (e.g., MgO, fumed silica or kaolin) to ensure continued separation of the anode and cathode, without which the cell or battery would experience a short circuit and cease to function upon activation. In contrast, the chemistry of the present electrolyte is such that, after activation, the flowability of the molten salt is less than that of other salts used in thermal batteries, allowing the amount of binder to be minimized and even substantially eliminated.

In this regard, without being bound to any particular theory, it is believed that when electrolyte materials that contain significant amounts of lithium fluoride (e.g., at least about 42 wt % as discussed below) are heated, a portion of the lithium fluoride may remain in the solid-state which increases the viscosity of the electrolyte material as a whole which allows the binder to be eliminated from the material. Lithium fluoride is characterized by a relatively higher melting temperature as compared to other electrolyte salts which allows portions of the lithium fluoride to remain in solid form.

Various exemplary electrolyte compositions, in accordance with various embodiments of the disclosure, include a salt mixture of lithium bromide (LiBr), lithium chloride (LiCl), lithium fluoride (LiF) and, optionally, potassium bromide (KBr). The ratio of the three or four salts may vary, with preferred embodiments being in the ranges shown below.

TABLE 3

Exemplary compositions for electrolyte materials

| Component | Exemplary Wt % | Exemplary Wt % | Exemplary Wt % | Exemplary Wt % |
|---|---|---|---|---|
| KBr | 0-12 | 1-9 | 1-3 | 9-12 |
| LiBr | 25-41 | 25-41 | 30-38 | 32-39 |
| LiCl | 4-14 | 4-14 | 9-12 | 5-7 |
| LiF | 42-64 | 42-64 | 50-60 | 42-53 |

In this regard it is to be noted that, more generally, the electrolyte material may contain, in various exemplary embodiments: at least about 25 wt % lithium bromide, at least about 30 wt %, at least about 35 wt %, or even at least about 40 wt % lithium bromide; at least about 4 wt % lithium chloride, at least about 6 wt %, at least about 8 wt %, at least about 10 wt %, or even at least about 12 wt % lithium chloride; at least about 42 wt % lithium fluoride, at least about 45 wt %, at least about 50 wt %, at least about 55 wt %, or even at least about 60 wt % lithium fluoride; and, optionally, at least about 1 wt % potassium bromide, at least about 2 wt %, at least about 4 wt %, at least about 8 wt %, or even at least about 10 wt % potassium bromide. It is to be further noted that, in these or other exemplary embodiments, the electrolyte material may contain: no more than about 41 wt % lithium bromide; no more than about 14 wt % lithium chloride; no more than about 64 wt % lithium fluoride; and, when present, no more than about 12 wt % potassium bromide. Finally, it is to be noted that, in one or more of the embodiments detailed herein, the concentration of a recited component may be within a range bounded by any combination or permutation of the higher and lower concentration limits noted herein (e.g., between about 25 wt % and about 41 wt %, or between about 30 wt % and about 41 wt % lithium bromide), without departing from the intended scope of the present disclosure.

In accordance with various embodiments of the disclosure, electrolyte material may be formed by measuring a desired amount of each salt in the composition, physically mixing the salts, fusing the mixed material at high temperature (e.g., about 500° C.±about 50° C.), grinding the fused electrolyte, and passing the ground product through a sieve. Generally, the size of the particles of the electrolyte material is not critical; however, the particle size should be consistent with typical battery manufacturing operations as dependent on the battery design as appreciated by those of skill in the art. For example, tape casting methods generally use smaller particles than pellet pressing methods. When pellet pressing methods are used to form the electrolyte material (such as when the electrolyte material is used to flood a cathode or anode), the electrolyte particles should be screened such that they are sufficiently small to allow proper filling of the die but yet large enough such that they do not infiltrate the gap between the punch and the die. In tape casting methods, the particles should be sufficiently small to allow casting of a thin tape. Suitable particle size ranges may be readily determined by those of skill in the art.

The starting salt materials may be either in powder or granulated form and are preferably dried at a temperature sufficient to remove an amount of absorbed moisture (if any). Moisture may be removed as much as economically practical and as much as practical in view of the selected manufacturing process. Generally, the amount of moisture should be reduced to a level that does not cause unacceptable amounts of anode material oxidation. In some embodiments of the present disclosure, the electrolyte salt material may be heated, for example to a temperature of from about 100° C. to about 400° C., to remove moisture from the material.

Physical mixing may proceed via any mechanical mixing method, for example, stirring the salts by hand, agitating the ingredients in a Turbula blender, rolling the container on a jar mill, or the like. Mixing may proceed from 15 minutes to about 2 hours, depending on the total amount of salt and the manner of mixing.

After the mixing is completed, the mixed powder may be removed from the mixing container and placed into a crucible suitable for fusing the salts at high temperature. Exemplary crucibles may be formed of refractory material that is able to withstand the high temperatures required to fuse the salts and be resistant to the corrosive effects of the molten salts. Salts are fused at a temperature sufficient to melt the bulk of the material such as, for example, at least about 500° C. or even at least about 650° C. In accordance with various aspects of these embodiments, depending on the ratio of salts, only a portion of the mixture might fully melt during the fusing process.

After fusing, the resulting fused salt is ground. Grinding may take place either by hand using a mortar-pestle for small amounts, or using a large grinder such as a quaker mill for large amounts. After grinding, the ground fused salt is passed through a screen to remove any large particles that were missed in the grinding step. The large particles may be ground a second time to reduce their size to pass through the screen. Mesh size of the screen is variable according to the preferences of the user and the intended application.

The resulting powder, after mixing, fusing, grinding and sieving, may then be pressed into pellets (i.e., wafers) for use as electrolyte-separator or mixed into cathode powders and/or anode powders to form an electrode-electrolyte composite and serve as the flooding electrolyte in those components. The pellets may be formed by a hydraulic press in which the powder material is introduced into a pellet die and leveled (either mechanically or by hand). A hydraulic punch is lowered and compresses the powder into a pellet (i.e., wafer). Pelletting pressures are not critical; however, it is preferred to use pressures near the highest capable pressures in the pelleting equipment within the mechanical limits of the equipment (e.g., the punch and die materials).

EXAMPLES

The following non-limiting examples set forth below are illustrative of various aspects of certain exemplary embodiments of the present disclosure. The compositions, methods and various parameters reflected therein are intended only to exemplify various aspects and embodiments of the disclosure, and are not intended to limit the scope of the claimed disclosure.

FIG. 1 shows a stack arrangement of a thermal battery, including heat pellet 108 that would be used to melt the electrolyte upon battery activation. This arrangement, without heat pellet 108, was used for the single cell tests discussed in the Examples.

Example 1

Figure 2:
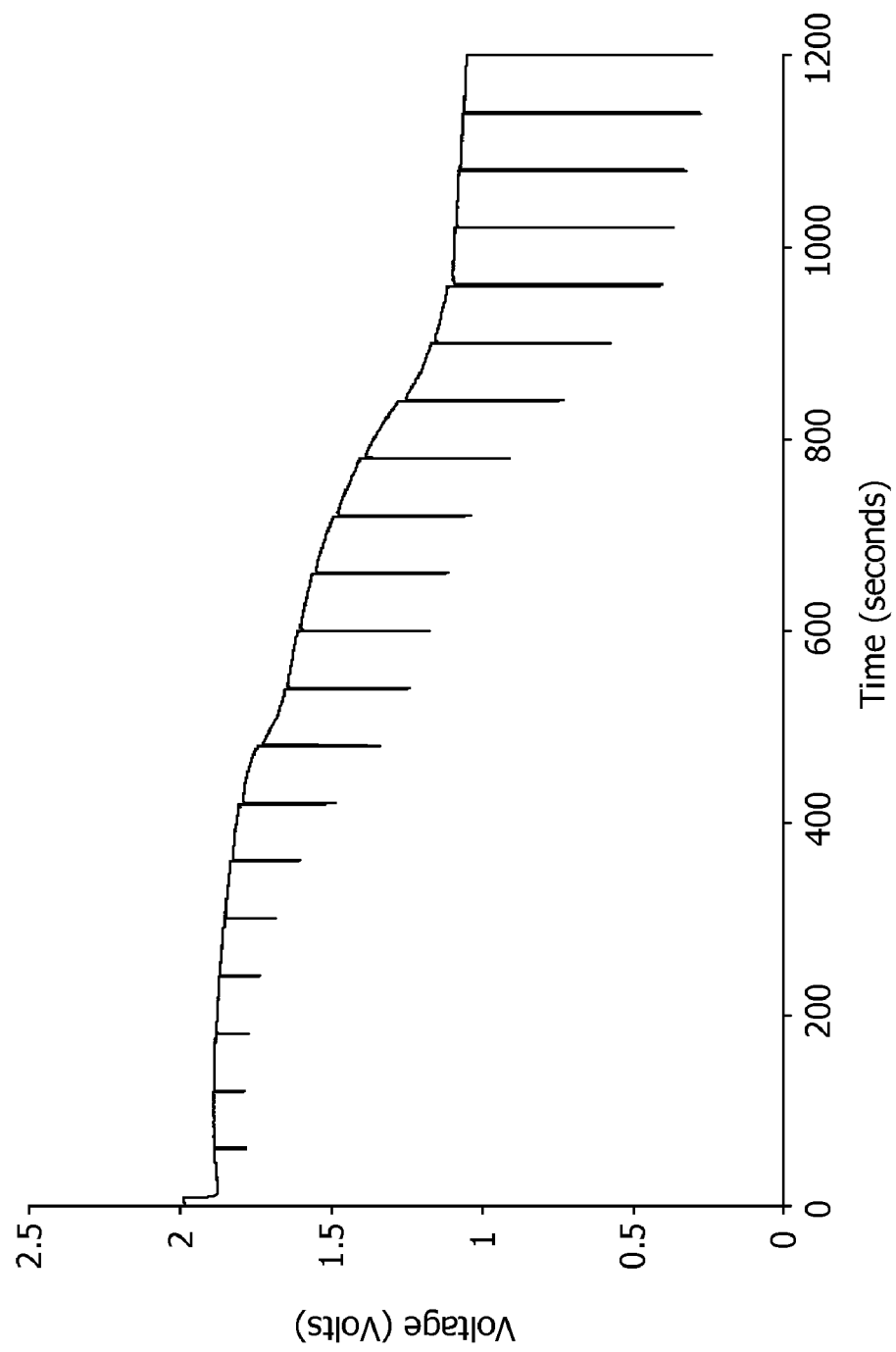
FIG. 2 illustrates a voltage trace of a thermal battery cell in accordance with a first embodiment of the disclosure.

Voltage Trace for a Cell Having an Electrolyte-Separator Composed of Substantially Binder-Free Ternary Electrolyte Material FIG. 2 illustrates a voltage trace from a single electrochemical cell including an electrolyte material, in accordance with embodiments of the disclosure, as the electrolyte-separator pellet. The composition of the electrolyte-separator of this cell was about 34 wt % LiBr, about 11 wt % LiCl, about 55 wt % LiF, and 0 wt % KBr. The cathode of the cell was an $FeS_2$ pellet flooded with a conventional KCl—LiCl eutectic electrolyte. The anode was a lithium-silicon alloy powder flooded with a conventional KCl—LiCl eutectic electrolyte. In accordance with the single cell test, the cell stack was heated to a temperature of 500° C. under compression to hold the pellets in contact with one another. A current draw of 1 ampere base load was applied with pulses of 5 amperes for 1 second duration applied every 60 seconds. The pulses appear as dips in the voltage trace. The single cell test did not short or experience an abnormally abbreviated life, which indicates the utility of the new electrolyte to serve as an electrolyte-separator pellet in a thermal battery.

Example 2

Figure 3:
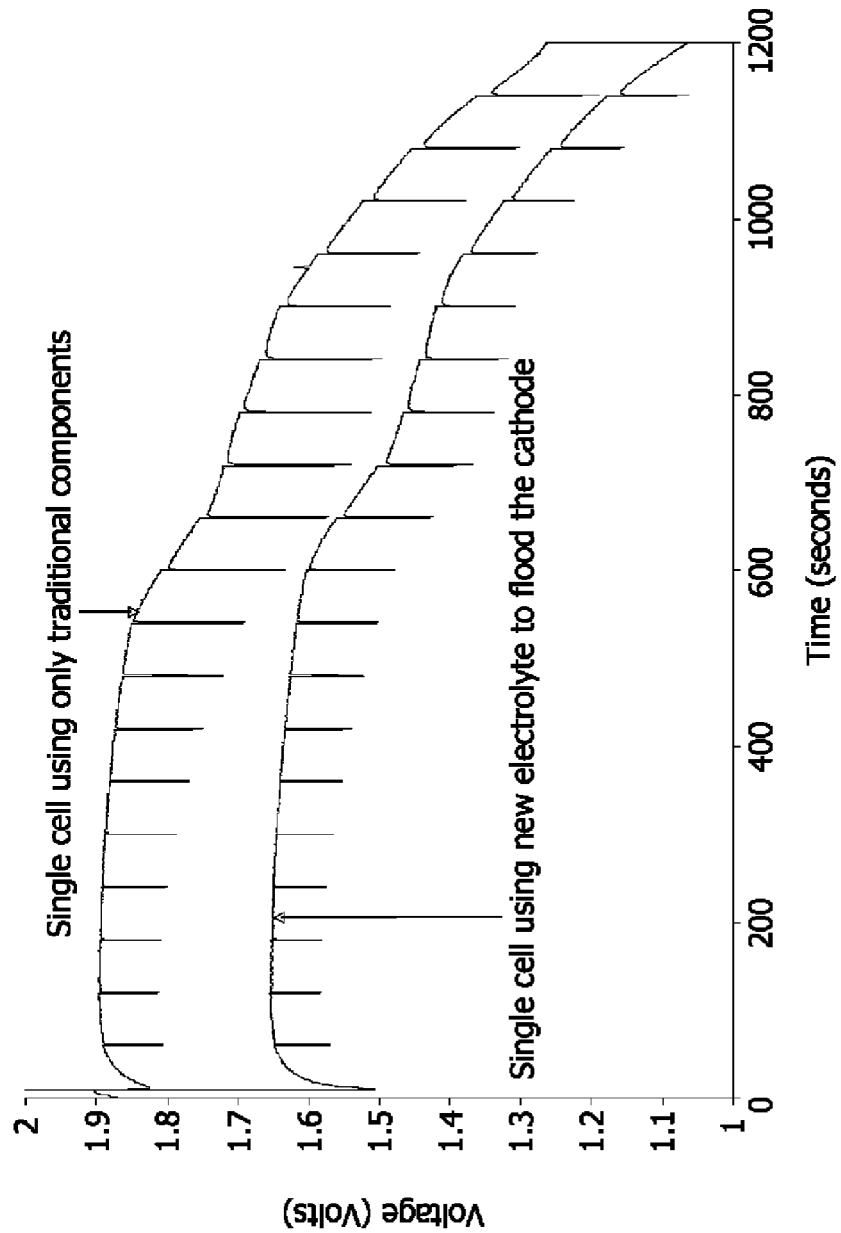
FIG. 3 illustrates a voltage trace of a thermal battery cell in accordance with a second embodiment of the disclosure and a conventional battery cell.

Voltage Traces and Impedance for Cells Having $FeS_2$ Cathodes Flooded with Binary Electrolyte Material Containing Binder and Flooded with Quaternary Binder-Free Electrolyte Material FIG. 3 illustrates voltage traces from two different single cell tests. The upper trace is from a single cell test using only conventional components, that is, the electrolyte of the present disclosure is not present in any of the three cell components; the cathode and anode are as described in Example 1 while the electrolyte separator is a fused electrolyte mixture of LiBr—LiCl—LiF bound with MgO. The lower voltage trace (for which the voltage values were all subtracted by 0.25V to allow both traces to be seen without overlap; that is, the actual voltage values for the lower trace shown in FIG. 3 are 0.25V greater than the values shown) shows a single cell test for which the cathode is flooded using binder-free electrolyte material having a composition of about 36 wt % LiBr, about 6 wt % LiCl, about 48 wt % LiF, and 10 wt % KBr.

Figure 4:
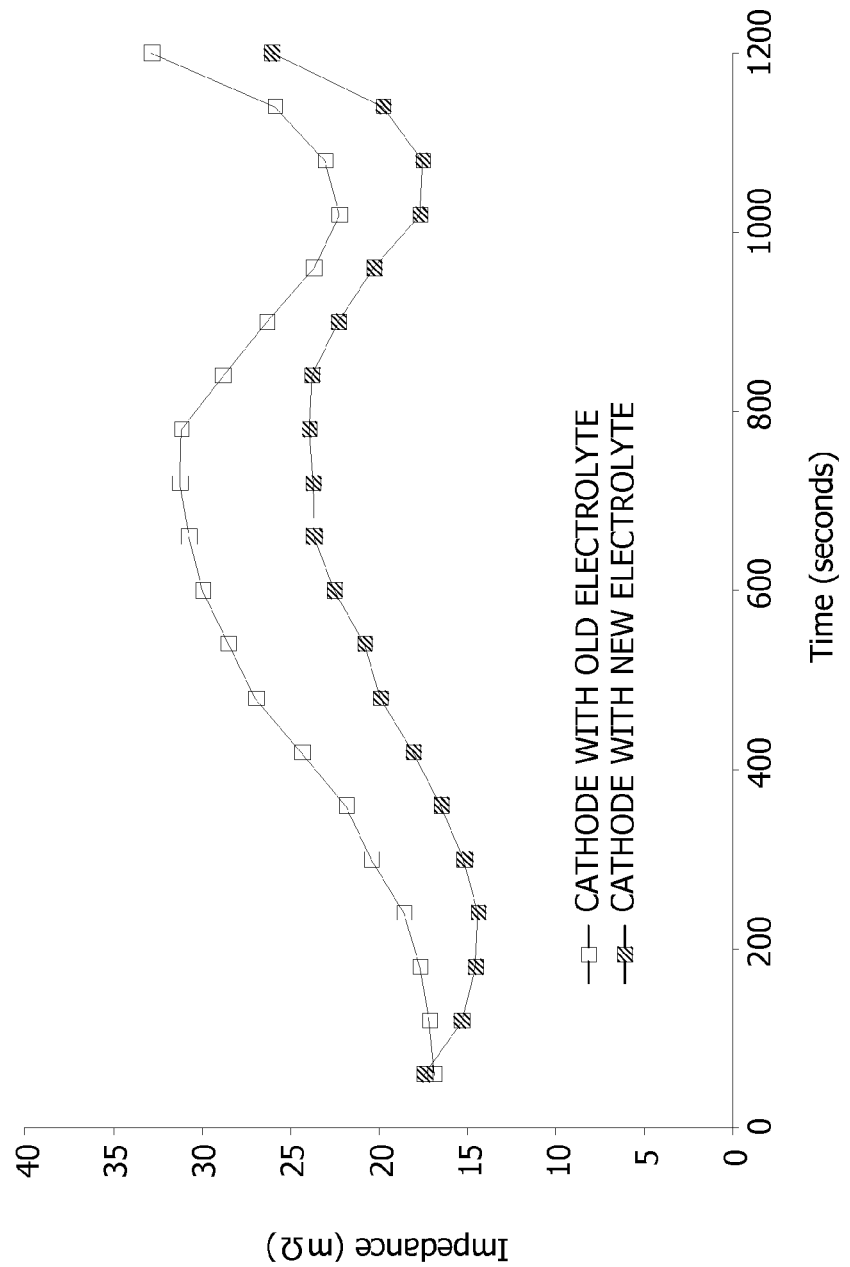
FIG. 4 illustrates an impedance trace of a thermal battery cell in accordance with the second embodiment of the disclosure and a conventional battery cell.

FIG. 4 illustrates the impedance of the two electrochemical cells of this example. The single cell test conditions were the same as those described in Example 1. This impedance was computed using the negative quotient of the change in voltage from the last data point prior to each pulse to the first data point collected during the pulse, divided by the current values for those same points. The following equation was used for determining the impedance:

$$\text{impedance} = -\frac{\Delta V}{\Delta i} = -\frac{V_{Base}}{i_{Pulse}} - \frac{V_{Pulse}}{i_{Base}}$$

The impedance for the single cell using conventional components is shown by open symbols, while the impedance for the single cell of one embodiment of the present disclosure using a cathode flooded with electrolyte having a composition of about 36 wt % LiBr, about 6 wt % LiCl, about 48 wt % LiF and about 10 wt % KBr is shown by the solid symbols. The improvement in performance in terms of reduced impedance with the new electrolyte described herein is clearly demonstrated.

Various principles of the disclosure have been described in illustrative embodiments. However, many combinations and modifications of the above-described formulations, proportions, elements, materials, and components used in the practice of the disclosure, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

Further, the description of various embodiments herein makes reference to the accompanying drawing figures, which show the embodiments by way of illustration and not of limitation. While these embodiments are described in sufficient detail to enable those skilled in the art to practice the disclosure, it should be understood that other embodiments may be realized and that logical and mechanical changes may be made without departing from the spirit and scope of the disclosure. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although certain embodiments may have been described as a method, it is contemplated that the method may be embodied as computer program instructions on a tangible computer-readable carrier and/or medium, such as a magnetic or optical memory or a magnetic or optical disk. All structural, chemical, and functional equivalents to the elements of the above-described embodiments are contemplated within the scope of this disclosure.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatus and methods without departing from the scope of the disclosure, it is intended that all matter contained in the above description and shown in the accompanying figures shall be interpreted as illustrative and not in a limiting sense.

What is claimed is:

1. An electrolyte material for use in thermal batteries, the electrolyte material having no more than 5 wt % binder and comprising:
   at least 25 wt % lithium bromide;
   at least 4 wt % lithium chloride; and
   at least 42 wt % lithium fluoride.

2. The electrolyte material of claim 1, wherein the electrolyte material comprises at least 1% potassium bromide.

3. The electrolyte material of claim 2, wherein the electrolyte material comprises no more than 12 wt % potassium bromide.

4. The electrolyte material of claim 2, wherein the lithium bromide, lithium chloride, lithium fluoride and potassium bromide form a eutectic mixture.

5. The electrolyte material of claim 1, wherein the electrolyte material has no more than 5 wt % MgO.

6. The electrolyte material of claim 1, wherein the electrolyte material comprises less than 0.1 wt % binder.

7. The electrolyte material of claim 1, wherein the electrolyte material consists essentially of lithium bromide, lithium chloride, lithium fluoride and any potassium bromide in the electrolyte material.

8. The electrolyte material of claim 1, wherein the electrolyte material comprises:
   no more than 41 wt % lithium bromide;
   no more than 14 wt % lithium chloride; and
   no more than 64 wt % lithium fluoride.

9. A composite electrode-electrolyte for use in a thermal battery, the composite electrode-electrolyte comprising:
   an electrode comprising cathode material or anode material; and
   an electrolyte material having no more than 5 wt % binder, the electrolyte material including:
      at least 25 wt % lithium bromide;
      at least 4 wt % lithium chloride; and
      at least 42 wt % lithium fluoride.

10. The composite electrode-electrolyte of claim 9, wherein the electrolyte material comprises at least 1% potassium bromide.

11. The composite electrode-electrolyte of claim 10, wherein the electrolyte material comprises no more than 12 wt % potassium bromide.

12. The composite electrode-electrolyte of claim 10, wherein the lithium bromide, lithium chloride, lithium fluoride and potassium bromide form a eutectic mixture.

13. The composite electrode-electrolyte of claim 9, wherein the electrolyte material has no more than 5 wt % binder.

14. The composite electrode-electrolyte of claim 9, wherein the electrolyte material comprises less than 0.1 wt % binder.

15. The composite electrode-electrolyte of claim 9, wherein the electrolyte material consists essentially of lithium bromide, lithium chloride, lithium fluoride and any potassium bromide present in the electrolyte material.

16. The composite electrode-electrolyte of claim 9, wherein the electrode comprises cathode material, the cathode material being selected from the group consisting of $FeS_2$, $CoS_2$ and mixtures thereof.

17. The composite electrode-electrolyte of claim 9, wherein the electrode comprises anode material, the anode material being selected from the group consisting of lithium, lithium alloys and mixtures thereof.

18. A battery comprising at least one electrochemical cell, each of the at least one electrochemical cells comprising an anode material, a cathode material, and an electrolyte material, the electrolyte material having no more than 5 wt % binder and comprising:
   at least 25 wt % lithium bromide;
   at least 4 wt % lithium chloride; and
   at least 12 wt % lithium fluoride.

19. The battery of claim 18, wherein the electrolyte material comprises at least 1% potassium bromide.

20. The battery of claim 19, wherein the electrolyte material comprises no more than 12 wt % potassium bromide.

21. The battery of claim 19, wherein the lithium bromide, lithium chloride, lithium fluoride and potassium bromide form a eutectic mixture.

22. The battery of claim 18, wherein the electrolyte material has no more than 5 wt % MgO.

23. The battery of claim 18, wherein the electrolyte material comprises less than 0.1 wt % binder.

24. The battery of claim 18, wherein the electrolyte material consists essentially of lithium bromide, lithium chloride, lithium fluoride and any potassium bromide present in the electrolyte material.

25. The battery of claim 18, wherein the electrolyte material comprises:
   no more than 41 wt % lithium bromide;
   no more than 14 wt % lithium chloride; and
   no more than 64 wt % lithium fluoride.

26. The battery of claim 18, wherein the electrolyte material and cathode material form a composite cathode-electrolyte and the cathode material is selected from the group consisting of $FeS_2$, $CoS_2$ and mixtures thereof.

27. The battery of claim 18, wherein the electrolyte material and anode material form a composite anode-electrolyte and the anode material is selected from the group consisting of lithium, lithium alloys and mixtures thereof.

28. The battery of claim 18, wherein the electrolyte material forms part of an electrolyte separator.

29. The battery of claim 18, wherein the battery is a thermal battery and comprises pyrotechnic material.

30. The battery of claim 18, further comprising a plurality of electrochemical cells.

* * * * *